Patented Mar. 21, 1939

2,151,531

UNITED STATES PATENT OFFICE 2,151,531

COPPER COMPLEX COMPOUNDS OF POLY-AZO DYESTUFFS

Hans Schindhelm, Frankfort-on-the-Main-Fechenheim, and Carl Theo Schultis, Bergen, near Frankfort-on-the-Main, Germany, assignors to General Aniline Works, Inc., New York, N. Y., a corporation of Delaware No Drawing. Application April 23, 1938, Serial No. 203,820. In Germany April 28, 1937

4 Claims. (Cl. 260—143)

The present invention relates to new copper complex compounds of polyazodyestuffs, more particularly to those of the general formula:

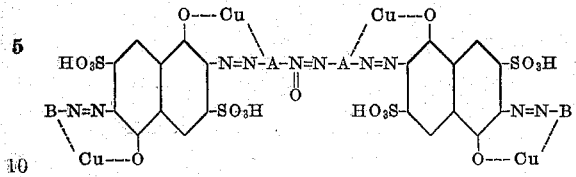

wherein A and B stand for aromatic radicles of the benzene series containing in o-position to the azo group a group capable of being metallized.

The new copper complex compounds are obtained according to the present invention for instance by the following process of manufacture. The diazo compounds of an aromatic nitro-amine of the benzene series containing in o-position to the azo group a group capable of being metallized is combined with one molecular weight of 1.5-dihydroxynaphthalene-3.7-disulfonic acid. The nitroazodyestuff formed is isolated and reduced by means of grape sugar in an alkaline solution, whereby the corresponding azoxy compound is formed. The azoxydisazodyestuff thus obtained is combined with two molecular weights of the diazo compound of an amine of the benzene series containing in o-position to the diazo group a group capable of being metallized. Then the azoxy-tetrakis-azodyestuff formed is converted in the usual manner into the corresponding copper complex compound.

The new copper complex compounds are valuable dyestuffs for the dyeing of vegetable fibers. They yield various shades of good fastness properties, especially of an excellent fastness to light which is caused by the fact that the formation of the copper complex occurs in four places of the dyestuff molecule. Moreover an especially good resistance of the dyestuffs to the reducing action which some kinds of fibers produce during the dyeing process is effected by the presence of an easily reducible group, i. e. the azoxy group, in the dyestuff molecule. By this valuable property the present new copper complex compounds are distinguished from similar known dyestuffs which do not contain such an easily reducible group in their molecule.

In order to further illustrate the invention, the following examples are given, the parts being by weight and all temperatures in degrees centigrade.

Example 1

168 parts of 5-nitro-2-amino-1-methoxybenzene are diazotised in the usual manner and the diazo compound formed is combined with 325 parts of 1.5-dihydroxynaphthalene-3.7-disulfonic acid in the presence of sodium acetate. The nitro-monoazodyestuff formed is isolated, then it is dissolved in a caustic soda solution and the nitrogroup is reduced by means of an aqueous solution of 150 parts of grape sugar.

The azoxy compound thus obtained is precipitated by neutralisation with hydrochloric acid and by the addition of sodium chloride; then it is isolated and combined in an alkaline solution with the diazo compound of 248 parts of 5-nitro-2-amino-1-anisol-4-sulfonic acid. The dyestuff formed is isolated, redissolved in water and heated to boiling during 8 hours in the presence of 400 parts of sodium acetate and 520 parts of copper sulfate. The copper complex compound formed of the formula:

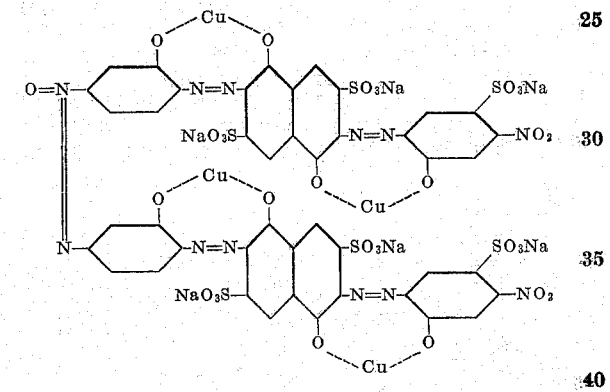

is isolated and dried. It is a dark powder which dissolves in water with a gray color. The dyestuff dyes cotton greenish-gray shades of a very good fastness to light. Moreover the dyestuff is very resistant to the reducing action which some kinds of fibers produce during the dyeing process.

Example 2

The intermediate dyestuff described in example 1 is combined instead of the diazo compound of 5-nitro-2-amino-1-methoxybenzene-4-sulfonic acid, with the diazo compound of 5-nitro-2-amino-1-methoxybenzene and then treated with a copper salt. Thus a similar dyestuff of the formula:

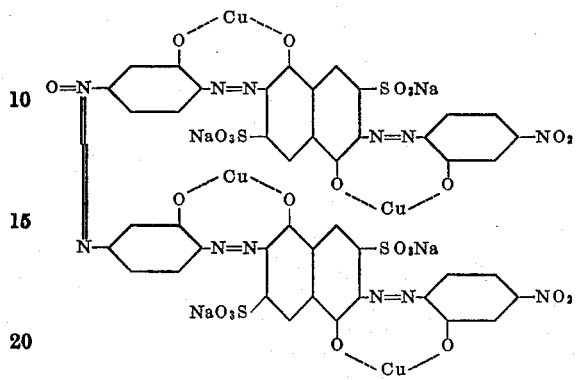

is obtained, which is, when dry, a dark powder, soluble in water with a bluish-green and in concentrated sulfuric acid with a gray color. The dyestuff dyes cotton gray shades of a good fastness to light and has a good resistance to the reducing action which some kinds of fibers produce during the dyeing process.

Example 3

182 parts of 5-nitro-2-amino-4-methyl-1-methoxybenzene are diazotized in the usual manner and the diazo compounds formed is combined with 320 parts of 1.5-dihydroxynaphthalene-3.7-disulfonic acid in the presence of sodium acetate. The monoazodyestuff formed is isolated and dissolved in a caustic soda solution. Then at about 80° the solution of 150 parts of grape sugar in a little amount of water is added and the mixture is stirred for some time. The azoxy compound formed is then isolated and, if necessary, purified by dissolving it in water and reprecipitating it from this solution. Then the compound is combined in an alkaline solution with the diazo compound of 158 parts of 5-chloro-2-amino-1-methoxybenzene. The dyestuff obtained is freed from some impurities by dissolving it in water and reprecipitating it from this solution. Hereafter it is again dissolved, 400 parts of sodium acetate and 520 parts of copper sulfate are added and the mixture is heated to boiling under a reflux condenser during about 8 hours. The copper complex compound of the dyestuff thus obtained of the formula:

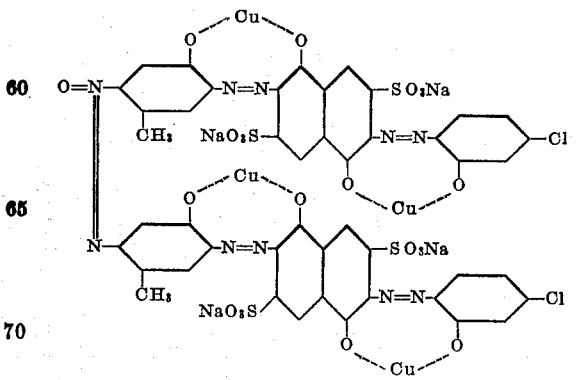

is then isolated, washed and dried. It is, when dry, a dark powder, soluble in water with a grayish green and in concentrated sulfuric acid with a gray color. It dyes cotton greenish gray shades fast to light and has a good resistance to the reducing action which some kinds of fibers produce during the dyeing process.

We claim:

1. Copper complex compounds of polyazodyestuffs of the general formula:

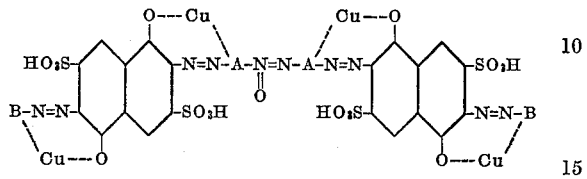

wherein A and B stand for aromatic radicles of the benzene series containing in o-position to the azo group a group capable of being metallized, which copper complex compounds dye vegetable fibers various shades of good fastness, especially to light, and possess a particularly good resistance to the reducing action which some kinds of fibers produce during the dyeing process.

2. The copper complex compound of the formula:

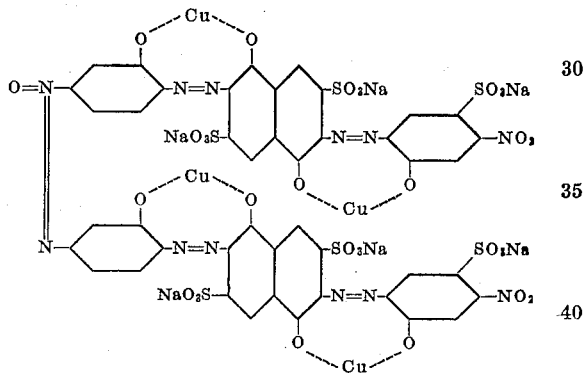

which is a dark powder, soluble in water with a bluish-green and in concentrated sulfuric acid with a gray color, dyeing cotton greenish gray shades of very good fastness to light and which is very resistant to the reducing action which some kinds of fibers produce during the dyeing process.

3. The copper complex compound of the formula:

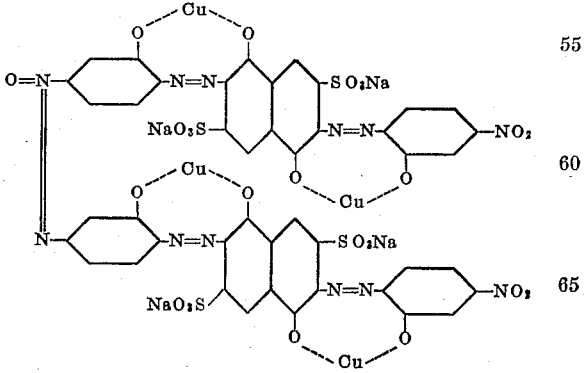

which is a dark powder, soluble in water with a bluish green and in concentrated sulfuric acid with a gray color, dyeing cotton gray shades of good fastness to light, and which is very resistant to the reducing action which some kinds of fibers produce during the dyeing process.

4. The copper complex compound of the formula:

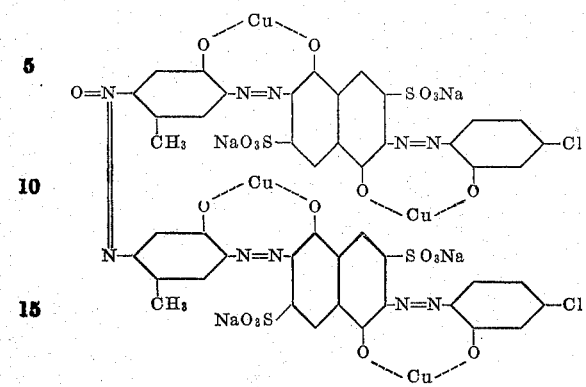

which is a dark powder, soluble in water with a grayish-green and in concentrated sulfuric acid with a gray color, dyeing cotton greenish-gray shades of good fastness to light, and which is very resistant to the reducing action which some kinds of fibers produce during the dyeing process.

HANS SCHINDHELM.
CARL THEO SCHULTIS.